United States Patent
Livneh et al.

(10) Patent No.: US 10,904,359 B2
(45) Date of Patent: Jan. 26, 2021

(54) SYSTEMS AND METHODS FOR SMART SCHEDULING OF OUTBOUND DATA REQUESTS

(71) Applicant: Facebook, Inc., Menlo Park, CA (US)

(72) Inventors: Amir Livneh, New York, NY (US); Adnan Majeed, Scotch Plains, NJ (US); Mergen Nachin, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 107 days.

(21) Appl. No.: 16/232,491

(22) Filed: Dec. 26, 2018

(65) Prior Publication Data
US 2020/0213417 A1 Jul. 2, 2020

(51) Int. Cl.
*H04L 29/08* (2006.01)
*H04L 29/06* (2006.01)
*H04L 12/26* (2006.01)

(52) U.S. Cl.
CPC ........ *H04L 67/325* (2013.01); *H04L 43/0876* (2013.01); *H04L 65/4084* (2013.01); *H04L 67/2847* (2013.01); *H04L 67/322* (2013.01)

(58) Field of Classification Search
CPC ............. H04L 43/0876; H04L 65/4084; H04L 67/2847; H04L 67/322; H04L 67/325
See application file for complete search history.

(56) References Cited

U.S. PATENT DOCUMENTS

| | | | | |
|---|---|---|---|---|
| 6,807,426 B2 * | 10/2004 | Pankaj | ............... | H04W 72/1226 370/328 |
| 7,406,098 B2 * | 7/2008 | Taneja | .................... | H04L 5/023 370/338 |
| 8,472,322 B2 * | 6/2013 | Black | ................... | H04L 1/0018 370/235 |
| 9,904,969 B1 * | 2/2018 | Westerhoff | ............ | H04L 12/413 |
| 10,362,098 B2 * | 7/2019 | McDuff | .............. | H04L 43/0876 |
| 2003/0198204 A1 * | 10/2003 | Taneja | .................. | H04W 28/10 370/332 |
| 2005/0188089 A1 * | 8/2005 | Lichtenstein | ......... | H04L 47/822 709/226 |
| 2008/0229017 A1 * | 9/2008 | Plamondon | ......... | H04L 67/2847 711/118 |
| 2008/0229020 A1 * | 9/2008 | Plamondon | ......... | H04L 67/2847 711/122 |
| 2008/0229021 A1 * | 9/2008 | Plamondon | ......... | H04L 67/2847 711/125 |
| 2008/0229023 A1 * | 9/2008 | Plamondon | ............. | H04L 67/28 711/126 |

(Continued)

*Primary Examiner* — Davoud A Zand
(74) *Attorney, Agent, or Firm* — Sheppard Mullin Richter & Hampton LLP

(57) ABSTRACT

Systems, methods, and non-transitory computer-readable media can receive a first data request, wherein the first data request is associated with a deadline and requests data to be transmitted to a computing device. It is estimated whether the first data request will be fulfilled before the deadline based on estimated response sizes of responses to a set of pending data requests and a bandwidth associated with the computing device. A data transmission mode of operation is determined for the computing device based on the estimating whether the first data request will be fulfilled before the deadline.

19 Claims, 7 Drawing Sheets

(56) References Cited

U.S. PATENT DOCUMENTS

| | | | |
|---|---|---|---|
| 2008/0229024 A1* | 9/2008 | Plamondon | H04L 67/28 |
| | | | 711/126 |
| 2008/0229025 A1* | 9/2008 | Plamondon | H04L 67/28 |
| | | | 711/126 |
| 2016/0021578 A1* | 1/2016 | Bostick | H04W 28/18 |
| | | | 370/332 |

* cited by examiner

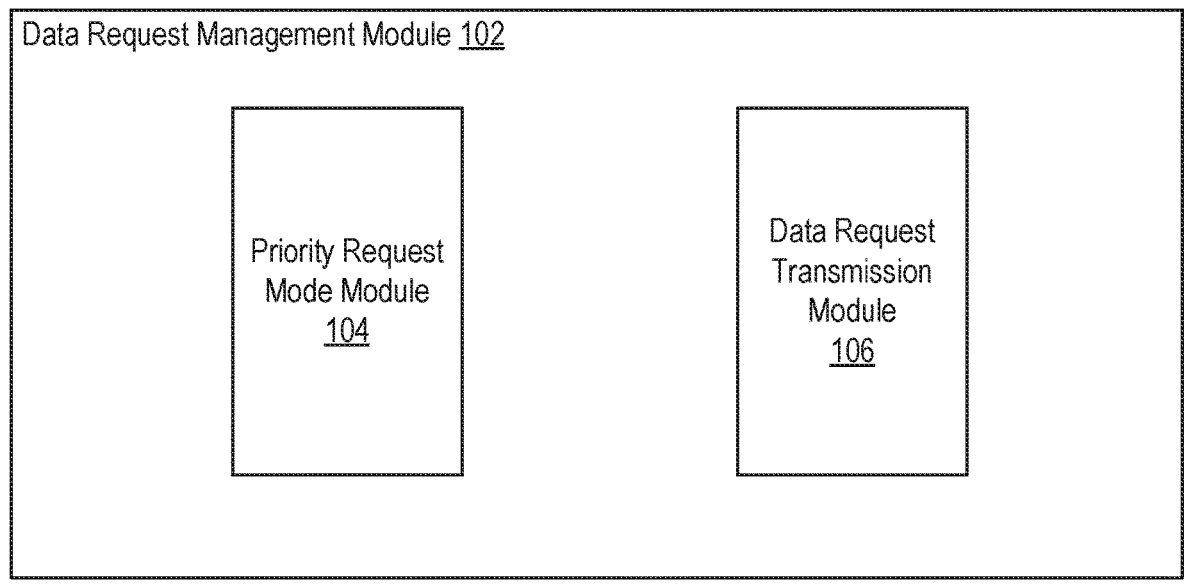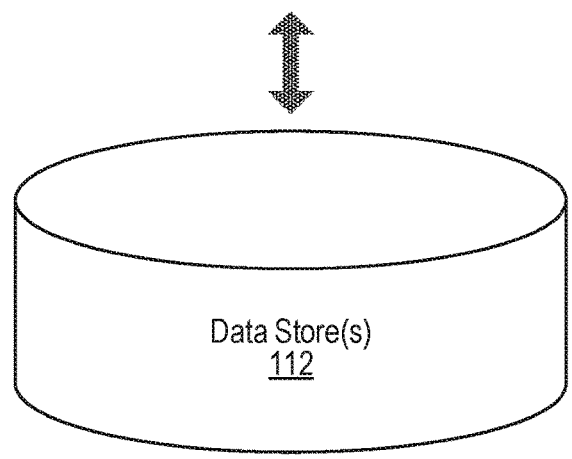
FIGURE 1

400

Receive a first data request, wherein the first data request is associated with a deadline and requests data to be transmitted to a computing device
402

Estimate whether the first data request will be fulfilled before the deadline based on estimated response sizes for a responses to a set of pending data requests and a bandwidth associated with the computing device
404

Determine a data transmission mode of operation for the computing device based on the estimating whether the first data request will be fulfilled before the deadline
406

Receive a first data request, wherein the first data request requests a portion of a video being presented on a computing device, and the first data request is associated with a deadline determined based on a remaining buffer of the video
502

Identify a set of pending data requests associated with the computing device, each pending data request being associated with an estimated response size
504

Determine a bandwidth of the computing device
506

Determine that the portion of the video is at risk of not being received at the computing device before the deadline based on the estimated response sizes and the bandwidth of the computing device
508

Delay one or more of the pending data requests based on the determining that the portion of the video is at risk of not being received at the computing device before the deadline
510

FIGURE 5

SYSTEMS AND METHODS FOR SMART SCHEDULING OF OUTBOUND DATA REQUESTS

FIELD OF THE INVENTION

The present technology relates to the field of digital data transmission. More particularly, the present technology relates to techniques for smart scheduling of outbound data requests.

BACKGROUND

Today, people often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others.

SUMMARY

Various embodiments of the present disclosure can include systems, methods, and non-transitory computer readable media configured to receive a first data request, wherein the first data request is associated with a deadline and requests data to be transmitted to a computing device. It is estimated whether the first data request will be fulfilled before the deadline based on estimated response sizes of responses to a set of pending data requests and a bandwidth associated with the computing device. A data transmission mode of operation is determined for the computing device based on the estimating whether the first data request will be fulfilled before the deadline.

In an embodiment, the first data request is associated with a video being presented on the computing device.

In an embodiment, the first data request requests a portion of the video.

In an embodiment, the deadline is determined based on a remaining buffer associated with the video.

In an embodiment, the estimating whether the first data request will be fulfilled before the deadline comprises determining that the portion of the video is at risk of not being received at the computing device before the deadline based on the estimated response sizes and the bandwidth associated with the computing device.

In an embodiment, the determining a data transmission mode of operation for the computing device comprises delaying one or more pending data requests of the set based on the determining that the portion of the video is at risk of not being received at the computing device before the deadline.

In an embodiment, the one or more pending data requests are delayed based on a determination that the one or more pending data requests do not satisfy a threshold level of priority.

In an embodiment, at least one of the one or more pending data requests that are delayed is associated with a content item that is not currently being presented on the computing device and is being pre-fetched.

In an embodiment, the estimating whether the first data request will be fulfilled before the deadline comprises determining that the first data request likely will be fulfilled before the deadline based on the estimated response sizes and the bandwidth associated with the computing device.

In an embodiment, the determining a data transmission mode of operation for the computing device comprises transmitting each of the pending data requests in the set of pending data requests in the order they were received based on the determining that the first data request likely will be fulfilled before the deadline.

In an embodiment, the bandwidth associated with the computing device is estimated.

In an embodiment, the bandwidth associated with the computing device is estimated based on historical throughout information for the computing device.

In an embodiment, the bandwidth associated with the computing device is estimated based on fulfillment times for data requests that have been fulfilled within a specified period of time.

In an embodiment, the set of pending data requests comprises a set of in-flight data requests that have been transmitted by the computing device but for which requested data has not yet been received; and a set of queued data requests that are scheduled to be transmitted by the computing device but have not yet been transmitted by the computing device.

In an embodiment, the determining the data transmission mode of operation for the computing device comprises delaying transmission of one or more data requests of the set of pending data requests based on a determination that the first data request is at risk of not being fulfilled before the deadline.

In an embodiment, a second data request is received while transmission of the one or more data requests is delayed, the second data request associated with a second deadline and requesting a second set of data to be transmitted to the computing device.

In an embodiment, an updated set of pending data requests that are pending when the second data request is received is identified. A second set of estimated response sizes of responses to the updated set of pending data requests is also identified. An updated bandwidth associated with the computing device is determined in response to receiving the second data request. It is determined that the second data request will likely be fulfilled by the second deadline based on the second set of estimated response sizes and the updated bandwidth.

In an embodiment, the one or more data requests of the set of pending data requests are transmitted in response to the determining that the second data request will likely be fulfilled by the second deadline.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including a data request management module, according to an embodiment of the present disclosure.

FIG. 4 illustrates an example method, according to an embodiment of the present disclosure.

FIG. 5 illustrates another example method, according to an embodiment of the present disclosure.

Figure 2:
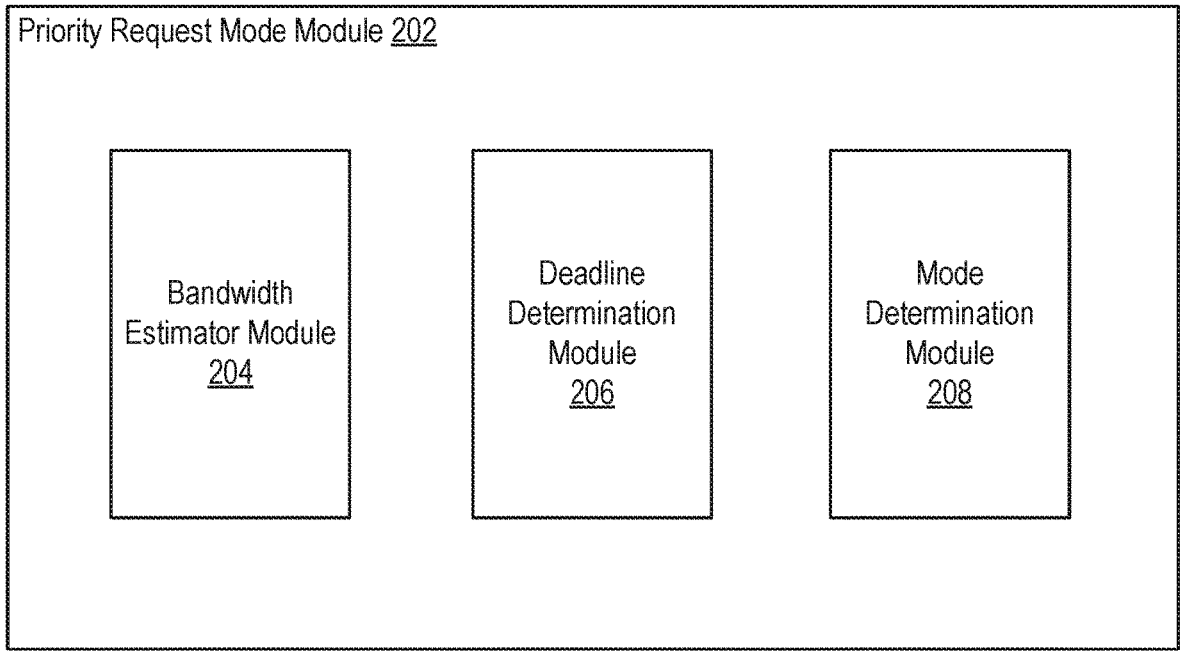
FIG. 2 illustrates a priority request mode module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Scheduling of Outbound Data Requests

People often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others.

When a user uses a computing device to receive content over a network, the computing device can transmit requests for content to one or more content providers. For example, if a user of a computing device would like to view a particular image posted to a social networking system, the computing device may transmit a data request for the particular image to the social networking system. The social networking system can transmit the particular image to the computing device in response to the data request.

At any given time, a computing device may have numerous requests for data waiting to be fulfilled. For example, if a user is using a computing device to stream a video that has been posted to a social networking system, the computing device may transmit multiple requests for different portions of the video. Furthermore, while one or more requests for the video are being fulfilled, the same computing device may transmit requests for other content items on the social networking system (e.g., images, other videos, or other content). However, a computing device has a finite amount of bandwidth to receive the data corresponding to such requests. As such, when a large number of requests are pending, the computing device may receive data corresponding to the various requests simultaneously, and it may take a longer time to fulfill certain data requests. It may be the case that non-critical data requests (e.g., requests for pre-fetching content that can be presented to a user at a later time) are interfering with more critical, time-sensitive data requests. This can be particularly problematic for time-sensitive data requests, such as when a user is streaming a video. If data for a video is delayed, presentation of the video may be interrupted, resulting in a sub-optimal user experience. In another example, delays receiving data pertaining to interactive, real-time features, such as interactive games, may result in poor performance and negative user experience. Conventional approaches may not be effective in addressing these and other problems arising in computer technology.

An improved approach rooted in computer technology overcomes the foregoing and other disadvantages associated with conventional approaches specifically arising in the realm of computer technology. In general, when a data request is received for transmission by a computing device (e.g., for transmission to a content provider), a determination can be made as to whether or not one or more pending high priority and/or time sensitive data requests can be fulfilled within a threshold period of time given other concurrent pending data requests associated with the computing device. Concurrent pending data requests can include data requests that have already been transmitted by the computing device, but for which a full response has not yet been received by the computing device (i.e., in-flight data requests), as well as data requests that are scheduled to be transmitted, but have not yet been sent out by the computing device (i.e., queued data requests). A threshold period of time associated with a high priority data request may be considered a deadline by which the high priority data request should be fulfilled. In certain embodiments, a data request can be considered fulfilled once all data requested by the data request has been received by the computing device. If it is determined that, in view of concurrent pending data requests, one or more pending high priority data requests are at risk of not being fulfilled before their associated deadlines, then transmission of at least some of the queued data requests can be delayed so that higher priority data requests can be fulfilled more quickly. Many variations are possible. More details relating to the disclosed technology are provided below.

FIG. 1 illustrates an example system 100 including a data request management module 102, according to an embodiment of the present disclosure. As shown in the example of FIG. 1, the data request management module 102 can include a priority request mode module 104 and a data request transmission module 106. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the data request management module 102 can be implemented in any suitable combinations.

In some embodiments, the data request management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the data request management module 102 can be, in part or in whole, implemented as software running on one or more computing devices or systems, such as on a server system or a client computing device. In some instances, the data request management module 102 can be, in part or in whole, implemented within or configured to operate in conjunction with or be integrated with a social networking system (or service), such as a social networking system 630 of FIG. 6. Likewise, in some instances, the data request management module 102 can be, in part or in whole, implemented within or configured to operate in conjunction with or be integrated with a client computing device, such as the user device 610 of FIG. 6. For example, the data request management module 102 can be implemented as or within a dedicated application (e.g., app), a program, or an applet running on a user computing device or client computing system. The application incorporating or implementing instructions for performing functionality of the data request management module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The data request management module 102 can be configured to communicate and/or operate with the at least one data store 112, as shown in the example system 100. The data store 112 can be configured to store and maintain various types of data. In some implementations, the data store 112 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some implementations, the data store 112 can store information to be utilized by the data request management module 102, such as a set of pending data requests, expected response sizes for the set of pending data requests, historical throughput information for a computing device, and the like.

The priority request mode module 104 can be configured to determine a mode of operation for a computing device, such as a user device 610. In certain embodiments, the priority request mode module 104 can transition a computing device between a normal mode and a priority request mode. In the normal mode, queued data requests of all priority levels may be transmitted by the computing device. For example, queued data requests may be transmitted in the order that they are received, regardless of priority level. In the priority request mode, queued data requests that are below a threshold priority level may be delayed, while queued data requests that satisfy the threshold priority level are transmitted. For example, in one example implementation, data requests may be assigned one of two priority levels: a first priority level representing a higher level of priority, or a second priority level representing a lower level of priority than the first priority level. In the priority request mode, queued data requests that are assigned the first priority level can be transmitted, while queued data requests that are assigned the second priority level may be delayed. For example, queued data requests that are assigned the second priority level may be delayed until the computing device is no longer operating in the priority request mode.

The priority request mode module 104 can transition a computing device between a normal mode and a priority request mode based on a determination (e.g., an estimate) as to whether one or more pending high priority data requests are at risk of not being fulfilled within one or more associated threshold periods of time, i.e., whether the one or more pending high priority data requests are at risk of not being fulfilled before one or more associated deadlines. In an embodiment, a high priority data request may be a data request that satisfies a threshold level of priority. In certain implementations, data requests that satisfy the threshold level of priority may be considered time-sensitive or otherwise critical, while data requests that do not satisfy the threshold level of priority may be considered non-time-sensitive or non-critical.

In an embodiment, the determination of whether one or more high priority data requests are at risk of not being fulfilled before a deadline can be performed each time a new data request is received for transmission. In an alternative embodiment, when the priority request mode module 104 receives a new data request, a determination can first be made as to whether the data request satisfies a minimum priority level threshold (e.g., whether the new data request is a high priority data request). If the new data request satisfies the minimum priority level threshold, the priority request mode module 104 can then make a determination as to whether one or more pending high priority data requests are at risk of not being fulfilled by one or more associated deadlines in light of all other pending data requests associated with the computing device. In an embodiment, the determination can include determining, for each in-flight high priority data request (i.e., each high priority data request that has already been transmitted by the computing device), whether the high priority data request is at risk of not being fulfilled before an associated deadline. In an embodiment, the determination can include determining, for each new data request that has been determined to be a high priority data request, whether the new data request is at risk of not being fulfilled before an associated deadline.

For a given high priority data request, estimating whether the high priority data request can be fulfilled by an associated deadline can include determining an available bandwidth of the computing device, determining a total response size of all pending data requests associated with the computing device, and estimating how long it will take to fulfill the high priority data request based on the available bandwidth and the total response size for all other pending data requests. Furthermore, in some embodiments, the determination of whether or not a high priority data request can be fulfilled within a threshold period of time can include determining the threshold period of time within which the high priority data request should be fulfilled (i.e., determining a deadline by which the high priority data request should be fulfilled). If it is determined, for one or more high priority data requests, that each high priority data request likely can be fulfilled before an associated deadline, the priority request mode module 104 can set the computing device to operate in the normal mode. However, if it is determined that, for one or more high priority data requests, a high priority data request is at risk of not being fulfilled before the deadline, then the priority request mode module 104 can set the computing device to operate in the priority request mode so that higher priority data requests (e.g., data requests satisfying a threshold level of priority) may be fulfilled more quickly. More details regarding the priority request mode module 104 will be provided below with reference to FIG. 2.

The data request transmission module 106 can be configured to transmit data requests based on a mode of operation of a computing device, as determined by the priority request mode module 104. If a computing device is operating in a normal mode, the data request transmission module 106 can be configured to transmit data requests of any priority level. For example, data requests may be transmitted based on the order they were received. If a computing device is operating in a priority request mode, the data request transmission module 106 can be configured to delay transmission of at least some data requests that fall below a threshold priority level, and to transmit data requests that satisfy the threshold priority level.

In certain embodiments, when a computing device is operating in the priority request mode, the data request transmission module 106 can be configured to delay transmission of all data requests that fall below a threshold level of priority until the computing device is no longer operating in the priority request mode. For example, consider an example scenario in which data requests can be assigned one of three priority levels: high priority, medium priority, or low priority. The threshold priority level may be defined such that when a computing device is operating in the priority request mode, the data request transmission module 106 transmits all high priority data requests, but does not transmit any medium priority or low priority data requests until the computing device is no longer operating in the priority request mode (i.e., is operating in a normal mode).

In other embodiments, when a computing device is operating in the priority request mode, rather than delaying transmission of all data requests that fall below the threshold level of priority, the data request transmission module 106 can delay some lower priority data requests while transmitting others. In such embodiments, the data request transmission module 106 can be configured to identify one or more "low priority" data requests (i.e., data requests that fall below the threshold level of priority) for transmission based on available bandwidth and/or based on priority levels of data requests. For example, in the example scenario described above in which data requests can be assigned high, medium, or low priority levels, if a computing device is operating in the priority request mode, all high priority data requests can be transmitted. However, rather than delaying transmission of all medium and low priority data requests, the data request transmission module 106 can identify one or more medium priority data requests that can be transmitted while still allowing all high priority data requests to be fulfilled within specified deadlines given current bandwidth conditions. The one or more medium priority data requests that satisfy those conditions can be transmitted. If current bandwidth conditions allow all medium priority data requests to be transmitted, then the data request transmission module 106 can transmit the medium priority data requests and can determine whether there are any low priority data requests that can also be transmitted while allowing all high priority data requests to be fulfilled within specified deadlines. If so, the identified low priority data requests can also be transmitted. Although various examples are discussed herein which describe a set number of priority levels that can be applied to data requests, it should be understood that the present technology can be applied to any number of priority levels.

FIG. 2 illustrates an example priority request mode module 202 according to an embodiment of the present disclosure. In some embodiments, the priority request mode module 104 of FIG. 1 can be implemented as the priority request mode module 202. As shown in the example of FIG. 2, the priority request mode module 202 can include a bandwidth estimator module 204, a deadline determination module 206, and a mode determination module 208.

The bandwidth estimator module 204 can be configured to calculate an estimated available bandwidth for a computing device based on historical throughput information. In an embodiment, the estimated available bandwidth can be calculated based on a moving average of fulfillment times for all data requests that have been fulfilled within a specified period of time (e.g., the previous five seconds). In other words, bandwidth for a computing device can be estimated by identifying a set of data requests that have been fulfilled in a specified period of time (e.g., the previous five seconds). For all data requests in the set of data requests, the size of the responses to the data requests can be added together, and the sum can be divided by the total amount of time it took to fulfill the data requests (i.e., for the computing device to receive requested data in response to the data requests).

The deadline determination module 206 can be configured to determine a deadline by which a high priority data request (i.e., a data request that satisfies a threshold level of priority) should be fulfilled. As mentioned above, in certain embodiments, a data request may be considered fulfilled once all data requested by the data request has been received at a computing device (e.g., a computing device that transmitted the data request). In certain embodiments, the deadline may define a period of time within which requested data corresponding to the high priority data request must be received in order to avoid disruption of a user experience. For example, in an example implementation, a pending (e.g., new and/or in-flight) high priority data request can be associated with a video being viewed by a user on a computing device. Earlier portions of the video may have already been requested and downloaded to the computing device, and the pending high priority data request may be requesting data for a later portion of the video. Earlier-downloaded portions of the video, which are now stored locally on the computing device, may allow for the video to continue playing for another seven seconds before the requested data corresponding to the pending high priority data request is needed. In other words, earlier-downloaded portions of the video may provide for a seven second video buffer. If the requested data is not received within seven seconds, playback of the video would have to be disrupted until the requested data is received. As such, in such a scenario, the deadline may be set at seven seconds.

The mode determination module 208 can be configured to determine a mode of operation for a computing device based on a determination as to whether a pending high priority data request can be fulfilled within a threshold period of time (i.e., by a deadline) if all pending data requests associated with the computing device are also processed. The determination can be made based on an estimated available bandwidth for the computing device (e.g., as determined by the bandwidth estimator module 204), and a deadline by which the pending high priority data request should be fulfilled (e.g., as determined by the deadline determination module 206).

The mode determination module 208 can be configured to identify a set of pending data requests for a computing device. As mentioned above, the set of pending data requests can include all in-flight data requests that have already been transmitted by the computing device but for which the requested data has not yet been received, and all queued data requests that are scheduled to be transmitted by the computing device but have not yet been transmitted. Each data request in the set of pending data requests can be associated with an expected response size. The expected response size can be indicative of an amount of data that is expected to be received in response to the data request. For example, if a particular data request is requesting an image that is 8 MB in size, the expected response size for that data request can be 8 MB. For example, all data requests requesting results for a particular type of query may be assigned an estimated response size. The mode determination module 208 can sum the expected response sizes for all data requests in the set of pending data requests to determine a total estimated response size for all pending data requests.

As mentioned above, the mode determination module 208 can receive a new data request. In response to receiving the new data request, the mode determination module 208 can analyze one or more pending high priority data requests to determine whether they are at risk of not being fulfilled by associated deadlines. The one or more pending high priority data requests can include, for example, the new data request if it is determined to be a high priority data request and/or in-flight high priority data requests that have been transmitted by a computing device. Each high priority data request being analyzed can be associated with an estimated response size, as well as a deadline by which the high priority data request should be fulfilled. Based on the estimated bandwidth of the computing device and the total estimated response size for all pending data requests, the mode determination module 208 can determine whether the high priority data request can be satisfied by the deadline. For example, consider an example scenario in which a computing device is estimated to have an available bandwidth of 100 MBps, the total estimated response size for all pending data requests is 500 MB, and the deadline by which a high priority data request should be fulfilled is seven seconds. Based on this information, the mode determination module 208 can determine that it will take approximately five seconds to fulfill all of the pending data requests, including the high priority data request. As such, it is likely that the high priority data request can be satisfied by the deadline, even if all other pending data requests are transmitted. Conversely, if the total estimated response size for all pending data requests is 900 MB, the mode determination module 208 can determine that it will take approximately nine seconds to fulfill all of the pending data requests, which means that the high priority data request would likely not be fulfilled by the deadline.

In an embodiment, a default mode of operation for a computing device may be a normal mode, in which pending data requests of all priority levels are transmitted. However, if the mode determination module 208 determines that a high priority data request is at risk of not being fulfilled by its deadline while the computing device is operating in the normal mode, the mode determination module 208 can switch the computing device to operate in a high priority request mode, in which transmission of at least some data requests that do not satisfy a threshold level of priority is delayed, as was described earlier. Conversely, if the mode determination module 208 determines that one or more high priority data requests (e.g., a new high priority data request and/or all in-flight high priority data requests) likely will be fulfilled by the deadline even if all other pending data requests are transmitted, the computing device can continue to operate in the normal mode or, if the computing device is operating in the priority request mode, can be switched back to operating in the normal mode.

In certain embodiments, the mode determination module 208 can be configured to determine an appropriate mode of operation for a computing device each time a new data request is received. In other embodiments, the mode determination module 208 can be configured to determine an appropriate mode of operation for a computing device each time a new data request that satisfies a threshold level of priority is received. For example, if data requests can be assigned either a high priority classification or a low priority classification, each time a new high priority data request is received, the mode determination module 208 can determine whether the computing device should operate in the normal mode or the priority request mode.

In certain embodiments, data requests may change priority level before they are fulfilled. For example, if a user is viewing a first video, and then switches to a second video, data requests associated with the first video may be changed from a higher priority level to a lower priority level, while data requests associated with the second video may change from a lower priority level to a higher priority level. The mode determination module 208 can be configured to determine an appropriate mode of operation for a computing device each time a pending data request changes from a lower priority request (e.g., falling below a threshold level of priority) to a higher priority request (e.g., satisfying the threshold level of priority), or vice versa.

In certain embodiments, the mode determination module 208 can also be configured to determine an appropriate mode of operation for a computing device each time a pending data request completes.

Figure 3:
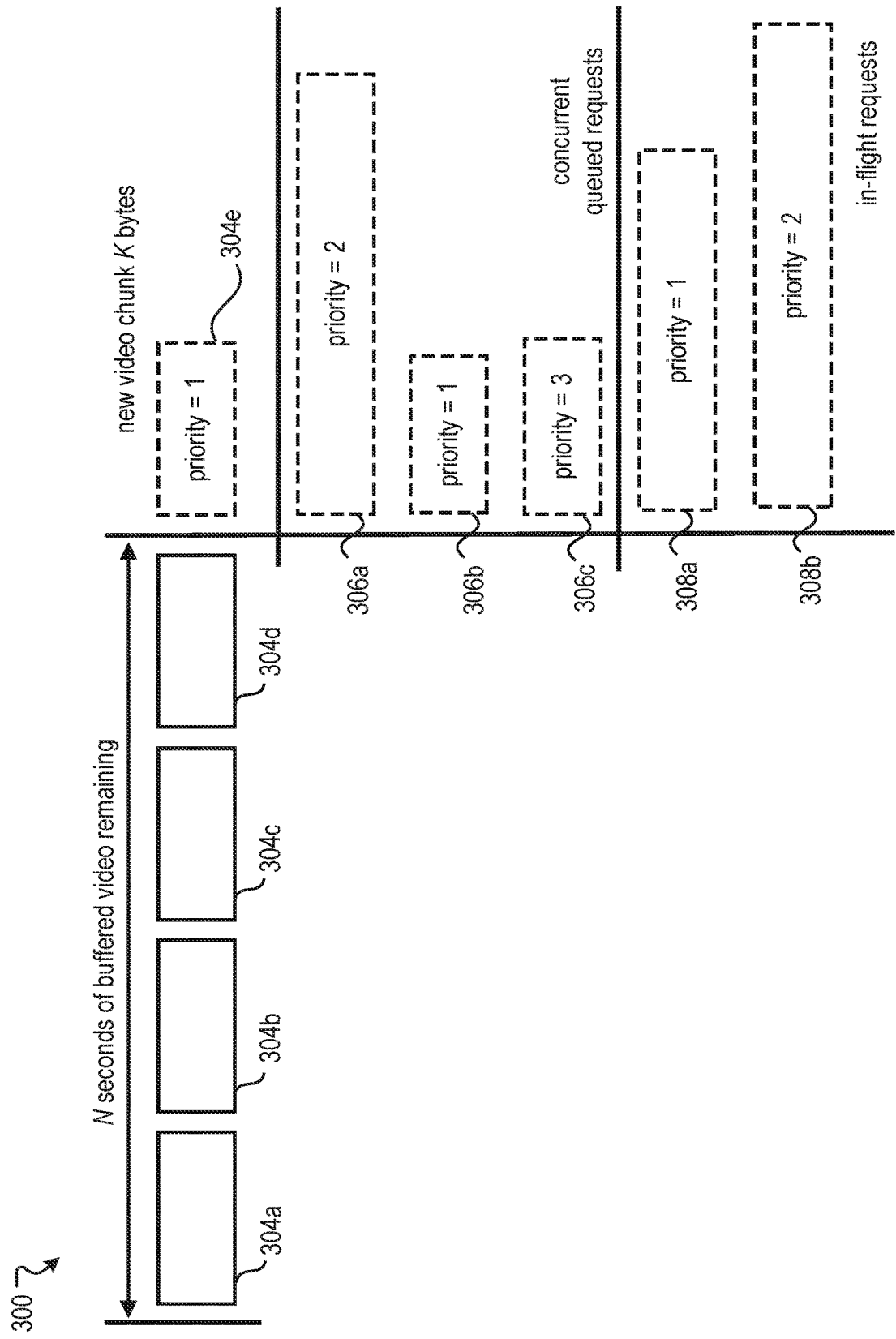
FIG. 3 illustrates an example scenario associated with smart scheduling of outbound data requests, according to an embodiment of the present disclosure.

FIG. 3 illustrates an example scenario 300 that illustrates functionality of the data request management module 102, according to an embodiment of the present disclosure. In the example scenario 300, a user is viewing a video on a computing device. The video includes a set of data blocks 304*a-d*. Data blocks 304*a-d* were previously requested and downloaded to the computing device, and are now saved locally to the computing device, but have not yet been presented to the user. As such, they represent a video buffer, such that the video can continue to play for N seconds using the locally stored data blocks 304*a-d*. The computing device has generated a data request 304*e* requesting a new data block. The new data request 304*e* has been assigned a level 1 priority, and is a high priority data request (e.g., satisfies a threshold level of priority) because it pertains to a video that is currently being viewed by the user. If the requested data associated with data request 304*e* is not received within N seconds, playback of the video will be disrupted. The computing device includes additional pending data requests. The pending data requests include two in-flight data requests 308*a* and 308*b* which have already been transmitted by the computing device, as well as three queued data requests 306*a*, 306*b*, 306*c* which are scheduled to be transmitted, but have not yet been transmitted by the computing device. Data request 306*a* is assigned a priority of 2 (e.g., medium priority), data request 306*b* is assigned a priority of 1 (e.g., high priority), and data request 306*c* is assigned a priority of 3 (e.g., low priority). For example, data request 306*b* may be assigned a high level 1 priority because it relates to comments that are being presented live alongside the video being viewed by the user, while data request 306*c* may be assigned a low level 3 priority because it relates to pre-fetching a content item that is not currently being viewed by the user.

In an embodiment, when the new high priority data request 304e is generated, the data request management module 102 can determine whether it is likely that the requested data responsive to data request 304e will be received within N seconds based on the expected response sizes of the pending requests 306a-c, 308a-b, the expected response size of the data request 304e, and an estimated bandwidth of the computing device. If it is determined that the requested data block is likely to be received within N seconds even with transmission of all other concurrent pending data requests, the computing device can continue to operate in a normal mode and the concurrent pending data requests can be transmitted. However, if it is determined that the requested data block is likely not to be received within N seconds if concurrent pending data requests are transmitted, the computing device can be transitioned to operate in a priority request mode. In the priority request mode, transmission of any data requests below a priority level of 1 may be delayed. In the example scenario 300, during the priority request mode, the new high priority data request 304e and the concurrent queued data request 306b can be transmitted, while transmission of the queued data requests 306a and 306c is delayed until the next time the computing device is transitioned back to the normal mode. In certain embodiments, in addition to or instead of determining whether the new data request 304e will be fulfilled by a deadline, the data request management module 102 can make the determination for all in-flight high priority data requests. In the example scenario, this would include determining whether the in-flight data request 308a is likely to be fulfilled before an associated deadline based on the expected response sizes of other pending requests, the expected response size of the data request 308a, and an estimated bandwidth of the computing device.

FIG. 4 illustrates an example method 400, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can receive a first data request, wherein the first data request is associated with a deadline and requests data to be transmitted to a computing device. At block 404, the example method 400 can estimate whether the first data request will be fulfilled before the deadline based on estimated response sizes for responses to a set of pending data requests and a bandwidth associated with the computing device. At block 406, the example method 400 can determine a data transmission mode of operation for the computing device based on the estimated whether the first data request will be fulfilled before the deadline.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive a first data request, wherein the first data request requests a portion of a video being presented on a computing device, and the first data request is associated with a deadline determined based on a remaining buffer of the video. At block 504, the example method 500 can identify a set of pending data requests associated with the computing device, each pending data request being associated with an estimated response size. At block 506, the example method 500 can determine a bandwidth of the computing device. At block 508, the example method 500 can determine that the portion of the video is at risk of not being received at the computing device before the deadline based on the estimated response sizes and the bandwidth of the computing device. At block 510, the example method 500 can delay one or more of the pending data requests based on the determining that the portion of the video is at risk of not being received at the computing device before the deadline.

It is contemplated that there can be many other uses, applications, and/or variations associated with the various embodiments of the present disclosure. For example, in some cases, users can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
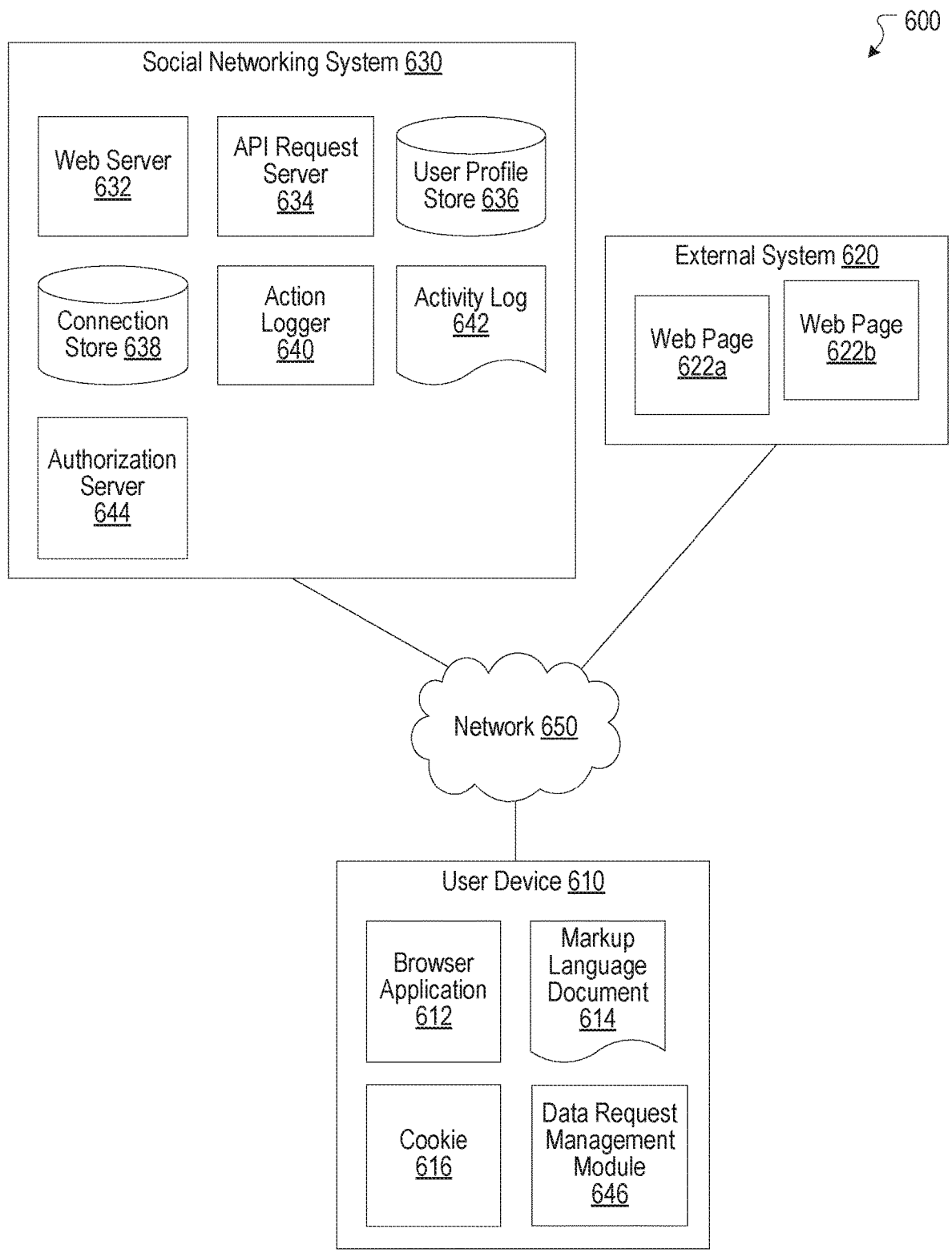
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API)

provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a data request management module 646. The data request management module 646 can, for example, be implemented as the data request management module 102, as discussed in more detail herein. In some embodiments, one or more functionalities of the data request management module 646 can be implemented in the social networking system 630. As discussed previously, it should be appreciated that there can be many variations or other possibilities.

Hardware Implementation

Figure 7:
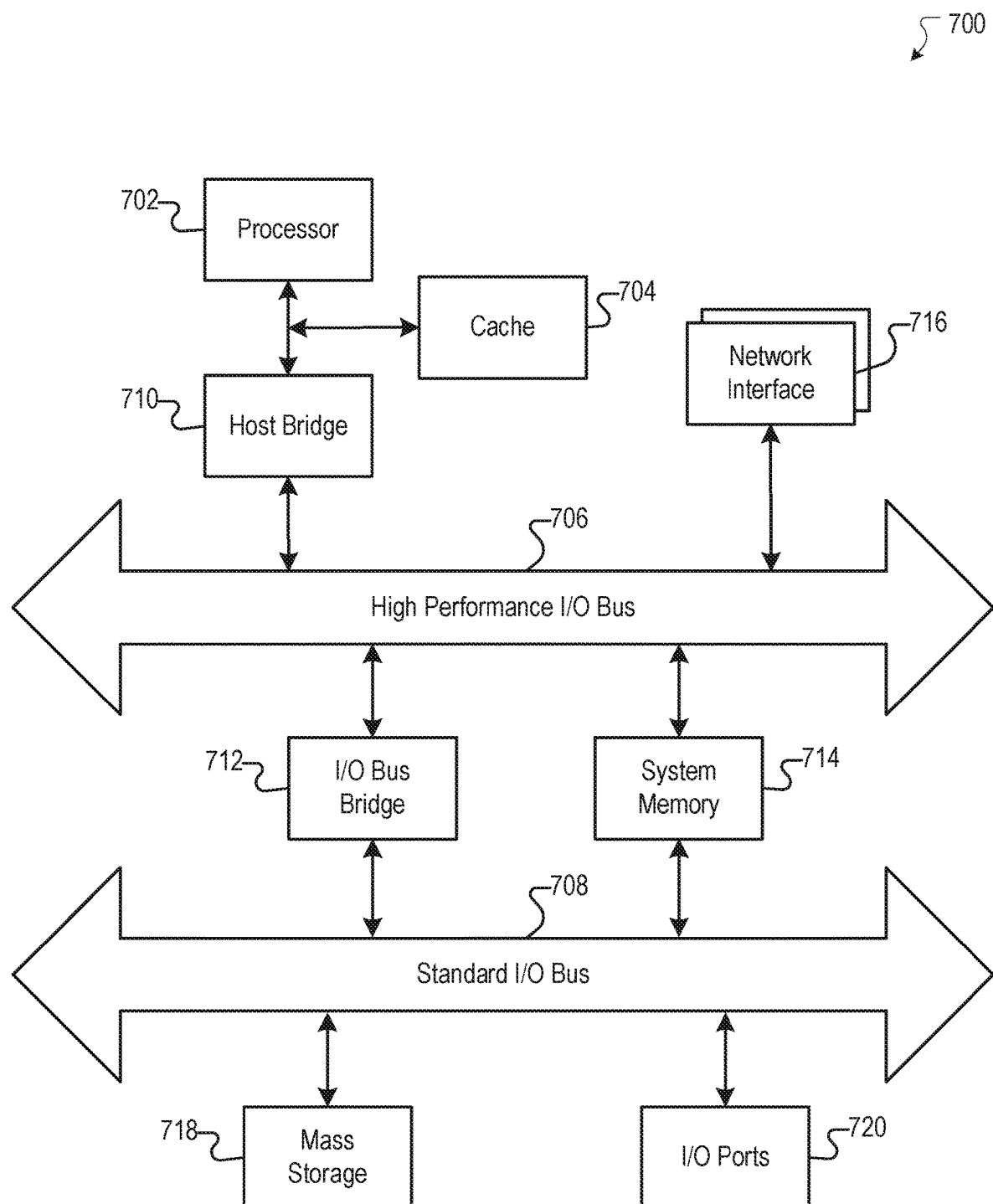
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a first data request, wherein the first data request is associated with a deadline and requests data to be transmitted to a computing device;
   estimating, by the computing system, whether the first data request will be fulfilled before the deadline based on estimated response sizes of responses to a set of concurrent queued data requests and a bandwidth associated with the computing device; and
   determining, by the computing system, a data transmission mode of operation for the computing device based on the estimating whether the first data request will be fulfilled before the deadline,
      wherein the determining the data transmission mode of operation comprises delaying one or more concurrent queued data requests of the set based on a determination that the one or more concurrent queued data requests do not satisfy a threshold level of priority.

2. The computer-implemented method of claim 1, wherein the first data request is associated with a video being presented on the computing device.

3. The computer-implemented method of claim 2, wherein the first data request requests a portion of the video.

4. The computer-implemented method of claim 3, wherein the deadline is determined based on a remaining buffer associated with the video.

5. The computer-implemented method of claim 4, wherein the estimating whether the first data request will be fulfilled before the deadline comprises determining that the portion of the video is at risk of not being received at the computing device before the deadline based on the estimated response sizes and the bandwidth associated with the computing device.

6. The computer-implemented method of claim 5, wherein the determining a data transmission mode of operation for the computing device comprises delaying one or more concurrent queued data requests of the set based on the determining that the portion of the video is at risk of not being received at the computing device before the deadline.

7. The computer-implemented method of claim 1, wherein at least one of the one or more pending concurrent queued data requests that are delayed is associated with a content item that is not currently being presented on the computing device and is being pre-fetched.

8. The computer-implemented method of claim 1, wherein the estimating whether the first data request will be fulfilled before the deadline comprises determining that the first data request likely will be fulfilled before the deadline based on the estimated response sizes and the bandwidth associated with the computing device.

9. The computer-implemented method of claim 8, wherein the determining a data transmission mode of operation for the computing device comprises transmitting each of the concurrent queued data requests in the set of concurrent queued data requests in the order they were received based on the determining that the first data request likely will be fulfilled before the deadline.

10. A system comprising:
at least one processor; and
a memory storing instructions that, when executed by the at least one processor, cause the system to perform a method comprising:
receiving a first data request, wherein the first data request is associated with a deadline and requests data to be transmitted to a computing device;
estimating whether the first data request will be fulfilled before the deadline based on estimated response sizes of responses to a set of concurrent queued data requests and a bandwidth associated with the computing device; and
determining a data transmission mode of operation for the computing device based on the estimating whether the first data request will be fulfilled before the deadline,
wherein the determining the data transmission mode of operation comprises delaying one or more concurrent queued data requests of the set based on a determination that the one or more concurrent queued data requests do not satisfy a threshold level of priority.

11. The system of claim 10, wherein the instructions, when executed by the at least one processor, further cause the system to perform:
estimating the bandwidth associated with the computing device.

12. The system of claim 11, wherein the bandwidth associated with the computing device is estimated based on historical throughout information for the computing device.

13. The system of claim 12, wherein the bandwidth associated with the computing device is estimated based on fulfillment times for data requests that have been fulfilled within a specified period of time.

14. The system of claim 10, wherein the set of concurrent queued data requests comprises
a set of in-flight data requests that have been transmitted by the computing device but for which requested data has not yet been received; and
a set of concurrent queued data requests that are scheduled to be transmitted by the computing device but have not yet been transmitted by the computing device.

15. A non-transitory computer-readable storage medium including instructions that, when executed by at least one processor of a computing system, cause the computing system to perform a method comprising:
receiving a first data request, wherein the first data request is associated with a deadline and requests data to be transmitted to a computing device;
estimating whether the first data request will be fulfilled before the deadline based on estimated response sizes of responses to a set of concurrent queued data requests and a bandwidth associated with the computing device; and
determining a data transmission mode of operation for the computing device based on the estimating whether the first data request will be fulfilled before the deadline,
wherein the determining the data transmission mode of operation comprises delaying one or more concurrent queued data requests of the set based on a determination that the one or more concurrent queued data requests do not satisfy a threshold level of priority.

16. The non-transitory computer-readable storage medium of claim 15, wherein the determining the data transmission mode of operation for the computing device comprises delaying transmission of one or more data requests of the set of concurrent queued data requests based on a determination that the first data request is at risk of not being fulfilled before the deadline.

17. The non-transitory computer-readable storage medium of claim 16, wherein the instructions, when executed by at least one processor of the computing system, further cause the computing system to perform:
receiving a second data request while transmission of the one or more data requests is delayed, the second data request associated with a second deadline and requesting a second set of data to be transmitted to the computing device.

18. The non-transitory computer-readable storage medium of claim 17, wherein the instructions, when executed by at least one processor of the computing system, further cause the computing system to perform:
identifying an updated set of concurrent queued data requests that are pending when the second data request is received and a second set of estimated response sizes of responses to the updated set of concurrent queued data requests;
determining an updated bandwidth associated with the computing device in response to receiving the second data request; and
determining that the second data request will likely be fulfilled by the second deadline based on the second set of estimated response sizes and the updated bandwidth.

19. The non-transitory computer-readable storage medium of claim 18, wherein the instructions, when executed by at least one processor of the computing system, further cause the computing system to perform: transmitting the one or more data requests of the set of concurrent queued data requests in response to the determining that the second data request will likely be fulfilled by the second deadline.

* * * * *